(12) United States Patent
Wetzig et al.

(10) Patent No.: US 12,492,960 B2
(45) Date of Patent: Dec. 9, 2025

(54) VACUUM LEAK DETECTION SYSTEM, GAS CONTROL UNIT AND METHOD FOR GAS LEAK DETECTION

(71) Applicant: INFICON GmbH, Cologne (DE)

(72) Inventors: Daniel Wetzig, Cologne (DE); Maximilian Reismann, Cologne (DE); Josef Grenz, Cologne (DE); Hendrik Van Triest, Cologne (DE)

(73) Assignee: INFICON GmbH, Cologne (DE)

( * ) Notice: Subject to any disclaimer, the term of this patent is extended or adjusted under 35 U.S.C. 154(b) by 342 days.

(21) Appl. No.: 18/016,830

(22) PCT Filed: Jul. 15, 2021

(86) PCT No.: PCT/EP2021/069759
§ 371 (c)(1),
(2) Date: Jan. 18, 2023

(87) PCT Pub. No.: WO2022/017907
PCT Pub. Date: Jan. 27, 2022

(65) Prior Publication Data
US 2023/0273087 A1 Aug. 31, 2023

(30) Foreign Application Priority Data
Jul. 24, 2020 (DE) .......................... 102020119600.8

(51) Int. Cl.
*G01M 3/20* (2006.01)
(52) U.S. Cl.
CPC .................................. *G01M 3/202* (2013.01)
(58) Field of Classification Search
CPC .......... G01M 3/02; G01M 3/027; G01M 3/04; G01M 3/16–187; G01M 3/20; G01M 3/202; G01M 3/229
See application file for complete search history.

(56) References Cited

U.S. PATENT DOCUMENTS

| | | | |
|---|---|---|---|
| 5,369,982 A | 12/1994 | Holthaus | |
| 2007/0000309 A1* | 1/2007 | Bohm | G01M 3/202 73/40.7 |
| 2009/0277249 A1* | 11/2009 | Polster | G01M 3/229 73/40.7 |
| 2010/0005861 A1* | 1/2010 | Wetzig | G01M 3/202 73/40.7 |

(Continued)

FOREIGN PATENT DOCUMENTS

| | | |
|---|---|---|
| CN | 103119413 A | 5/2013 |
| CN | 103649709 A | 3/2014 |

(Continued)

OTHER PUBLICATIONS

DE-102013000086-A1 (Year: 2014).*

*Primary Examiner* — Fatemeh Esfandiari Nia
(74) *Attorney, Agent, or Firm* — Kirton McConkie; Whitney Blair

(57) ABSTRACT

A vacuum leak detection system may comprise a test chamber unit having a test chamber gas inlet and a test chamber gas outlet, a gas detection unit having a gas detection gas inlet and a gas detection gas outlet, and a gas control unit connecting the test chamber gas inlet and the test chamber gas outlet to the gas detection gas inlet and the gas detection gas outlet, which is connected to the test chamber unit and to the gas detection unit, and which has separate gas line paths for optionally connecting the gas inlets and the gas outlets of the test chamber unit and the gas detection unit, wherein the gas control unit has a third gas inlet which is open towards the atmosphere and which can be connected to the test chamber gas inlet via a gas line path running through the gas control unit.

28 Claims, 1 Drawing Sheet

(56) References Cited

U.S. PATENT DOCUMENTS

2014/0096595 A1* 4/2014 Wetzig .................. G01M 3/229
  73/40.7
2014/0123732 A1* 5/2014 Walter .................. G01M 3/202
  73/40
2018/0188130 A1* 7/2018 Hogreve ............... G01M 3/227

FOREIGN PATENT DOCUMENTS

| CN | 109323812 A | | 2/2019 | |
|----|----|----|----|----|
| DE | 4335894 A1 | | 10/1993 | |
| DE | 102013000086 A1 | * | 7/2014 | ............ G01M 3/027 |
| EP | 2447694 A1 | | 5/2012 | |

* cited by examiner

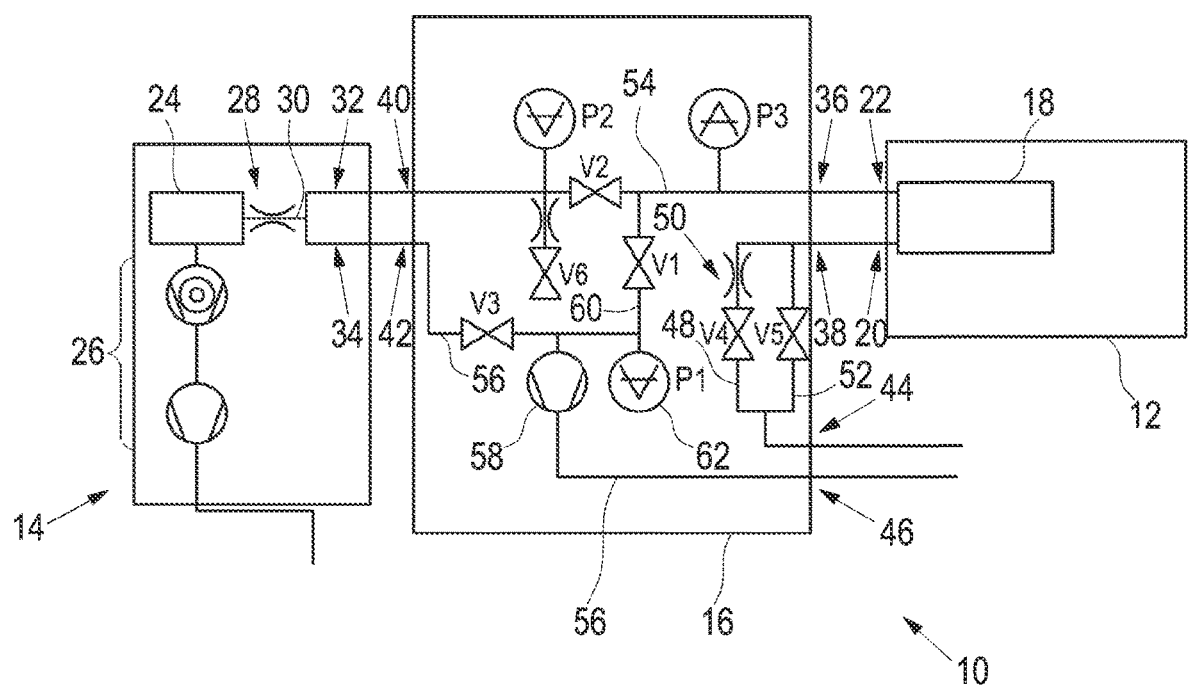

VACUUM LEAK DETECTION SYSTEM, GAS CONTROL UNIT AND METHOD FOR GAS LEAK DETECTION

RELATED APPLICATIONS

This application is a National Stage of International Application No. PCT/EP2021/069759, filed Jul. 15, 2021, and entitled VACUUM LEAK DETECTION SYSTEM, GAS CONTROL UNIT AND METHOD FOR GAS LEAK DETECTION, which claims priority to German Patent Application No. DE 10 2020 119 600.8, filed Jul. 24, 2020, which are each incorporated herein by reference in their entirety.

BACKGROUND

Classic helium vacuum leak detection devices, such as the UL3000® of INFICON, comprise a vacuum control unit with an integrated helium measuring device in the form of a mass spectrometer. The device includes a vacuum pump for connection to the test chamber or the test object via a separate vacuum line. Here, the vacuum control unit, the helium mass spectrometer and the vacuum pump form a unit within a common housing.

In another helium vacuum leak detection device, the LDC3000® of INFICON, a sector-field mass spectrometer and a turbomolecular pump with a valve block flanged thereto form a helium detector unit that is integrated in test systems. The test systems comprise a test chamber, a pump stand and the vacuum leak detector. The helium detector unit is connected in a gas-conducting manner to the vacuum test chamber and the pump stand via a respective connection line.

SUMMARY

The invention relates to a vacuum leak detection system, a gas control unit and a method for gas leak detection.

It is an object of the invention to provide a test gas vacuum leak detection system which enables a flexible and controllable supply of test gas from the test chamber to the gas detector.

According thereto, the vacuum leak detection system includes three components which are a test chamber unit with a test chamber gas inlet and a test chamber gas outlet, a gas detection unit with a gas detection gas inlet and a gas detection gas outlet, and a gas control unit connecting the gas inlets and the gas outlets of the gas detection unit and of the test chamber unit, the gas control unit being connected to the test chamber unit and the gas detection unit. The gas control unit comprises separate gas conduction paths for selective connection of the test chamber gas outlet to the gas detection gas inlet and the gas detection gas outlet.

The gas control unit can be connected to the test chamber unit and the gas detection unit of a vacuum leak detection system and has separate gas conduction paths for elective connection of the gas inlets and the gas outlets of the test chamber unit and the gas detection unit. In particular, a separate gas inlet of the gas control unit is provided to be connected to the test chamber gas inlet via a gas conduction path passing through the gas control unit, so as to supply carrier gas to the test chamber unit, which is drawn via the separate gas inlet of the gas control unit. A vacuum pump present in the gas control unit can be used for this purpose. In particular, the gas control unit is configured to control the carrier gas supply to the test chamber unit. This means that the carrier gas supply can be opened and/or closed by the gas control unit and/or that the amount of carrier gas can be varied. To this end, a flow throttle with a variable passage and/or a separately controllable valve may be provided, for example.

A variant of the invention may consist in the test chamber unit, the gas detection unit and the gas control unit being designed as separate modules adapted to be detachably connected with each other. The three modules can be directly coupled to each other without requiring separate vacuum lines for connecting the modules. In this manner, a common vacuum leak detection unit can be formed from the three modules, which, for example, is also arranged in a common housing. The test chamber unit, the gas control unit and/or the gas detection unit may be selectively exchanged for other modules so as to be able to adapt the vacuum leak detection system to individual test conditions.

BRIEF DESCRIPTION OF THE DRAWINGS

An example embodiment is explained in detail with reference to the accompanying drawing in which:

FIG. 1 shows the example embodiment in the form of a schematic block diagram.

DETAILED DESCRIPTION

An embodiment of the invention will be explained in detail hereunder with reference to the FIGURE. The FIGURE shows the embodiment in the form of a schematic block diagram.

The FIGURE shows the vacuum leak detection system 10 with the test chamber unit 12, the gas detection unit 14 and the gas control unit 16.

The test chamber unit 12 includes the vacuum test chamber 18 which may be a rigid test chamber or a flexible test chamber, e.g. in the form of a film chamber. The test chamber unit 12 has a test chamber gas inlet 20 and a test chamber gas outlet 22, which are both connected to the test chamber 18 in a gas-conducting manner.

The gas detection unit 14 includes the gas detector 24 which in the present embodiment is a quadrupole mass spectrometer 24 that is evacuated to atmosphere via a two-stage vacuum pump 26. The gas detector 24 is connected to a gas detection inlet 32 and a gas detection gas outlet 34 in a gas-conducting manner via a detection gas conduction path 30 provided with a throttle 28.

The gas control unit 16 is provided with three gas inlets 36, 42, 44 and three gas outlets 38, 40, 46. The first gas inlet 36 is connected in a gas-conducting manner to the test chamber gas outlet 22 through a detachable connection. Correspondingly, the first gas outlet 38 is connected to the test chamber gas inlet 20. Correspondingly, the second gas outlet 40 is connected to the gas detection inlet 32 and the second gas inlet 42 is connected to the gas detection outlet 34. The third gas inlet 44 and the third gas outlet 46 are each open to the atmosphere.

The third gas inlet 44 is connected in a gas-conducting manner to the first gas outlet 38 via a carrier gas conduction path 48. The carrier gas conduction path 48 comprises a selectively controllable valve V4 and a flow throttle 50 that causes a gas flow of e.g. 10 sccm. It is possible that the flow is adapted to the test chamber volume 18 using the flow throttle. Typically, carrier gas flows of 10 sccm to 100 sccm are selected, depending on the size of the test chamber volume 18. As used herein, selectively controllable means that the respective valve can be opened or closed selectively.

To this end, the gas control unit 16 includes electronics not illustrated in the FIGURE. The carrier gas path 48 is bypassed via a bypass path 52 which also connects the third gas inlet 44 to the first gas outlet 38 in a gas-conducting manner and comprises a selectively controllable valve V5 connected in parallel to the valve V4 and the throttle 50.

The first inlet 36 is connected in a gas-conducting manner to the second gas outlet 40 via a test gas conduction path 54 that includes a selectively controllable valve V2. Pressure measuring devices P2 and P3 are connected to the test gas conduction path 54, in order to measure the pressure downstream of the valve V2 in the direction of gas flow by means of the pressure measuring device P2 and to measure the pressure upstream of the valve V2 in the direction of gas flow by means of the pressure measuring device P3.

The second gas inlet 42 is connected in a gas-conducting manner to the third gas outlet 46 via a return test gas conduction path 56 that includes a selectively controllable valve V3 and a vacuum pump 58. An evacuation gas conduction path 60 that includes a selectively controllable valve V1 connects the test gas conduction path 54 to the return gas conduction path 56 between the valve V3 and the vacuum pump 58, upstream of the valve V2 in the direction of gas flow. Downstream of the valve V1 in the direction of gas flow, a pressure measuring device P1 identified by the reference numeral 62 is connected to the evacuation gas conduction path 60.

The measuring signals of the pressure measuring devices P1, P2 and P3 are transmitted to control electronics of the gas control unit 16 not illustrated in the FIGURE. The control electronics control the opening and closing states of the valves V1, V2, V3, V4, V5 and V6 and the operating state of the vacuum pump 58 in dependence on the measured pressure values and possible further control parameters.

Initially, valve V1 is open and at least valves V2 and V3, possibly also valves V4, V5 and V6, are closed, with the vacuum pump 58 operating and evacuating the test chamber 18. The gas from the test chamber 18 is evacuated to the third gas outlet 46 into the atmosphere via the test gas conduction path 54, the evacuation gas conduction path 60 and the return gas conduction path 56. In parallel, the vacuum pump 26 evacuates the gas detector 24.

When a suitable pressure threshold value is reached at the pressure measuring devices P3 and/or P1, valves V2 and V3 are opened and valve V1 is closed. Possibly, also valve V4 is opened. Valve V5 is initially closed. In this operating state, the vacuum pump 58 conveys gas from the test chamber 18 through the opened valve V2 via the test gas conduction path 54 into the gas detection inlet 32 from where the gas flows to the mass spectrometer of the gas detector 24 via the flow throttle 28, and via the gas detection outlet 34 and the second gas inlet 42, the return gas conduction path 56 and the opened valve V3 to the third gas outlet 46 and from there into the atmosphere. Through the third gas inlet 44, a suitable carrier gas flow flows into the test chamber 18 through the opened valve V4 via the carrier gas conduction path 48 and through the flow throttle 50. Here, the carrier gas is taken from the atmosphere surrounding the gas control unit 16. As an alternative, it is conceivable that a carrier gas source is connected to the third gas inlet 44.

After the termination of the gas leak detection, the flow throttle 50 can be bypassed via the bypass gas conduction path 52 and a correspondingly large amount of gas can be drawn from the third gas inlet in order to flush the test chamber 18, the valves and the gas conduction paths. For this purpose, it is also possible to connect a suitable flushing gas source to the third gas inlet 44. Flushing the measuring chamber 18, e.g. for reducing contaminations after the measurement of very large leakage rates, is effected via the path that leads to the pump 58 via the line sections 52, the valve V5, the test chamber 18, the test gas conduction path 54 and then directly via the opened valve V1 and the evacuation gas conduction path 60. During this flushing period, the inlet region to the flow throttle 28 for gas detection is separated by means of the closed valves V2 and V3. Flushing the lines 56 and the section between valves V2 and V3 is effected through the throttled flushing gas inlet via valve V6. During this phase, valves V2 and V1 are closed. The flushing gas is guided to the pump 58 via valves V6 and V3.

The gas conduction paths 48, 52, 54, 56 and 60, as well as the corresponding valves V1-V6, the throttles and the pressure measuring devices P1-P3 are arranged in a common, integral valve block arranged in the gas control unit 16, which block is a solid element. The pressure measuring devices, as well as the vacuum pump 58 may be connected to suitable connectors of the valve block. Valves V1-V6 may be arranged on the outside of the valve block in a manner known per se and may be connected to corresponding connectors of the respective gas conduction paths.

Compared to conventional vacuum leak detection systems, the invention offers the decisive advantage that, during the gas leak detection and for the subsequent flushing of the gas conduction paths and the test chamber, the gas conduction for the evacuation of the test chamber can be controlled by only one element, namely the gas control unit 16, without having to connect separate components to the test chamber and/or the gas detector via separate hose lines. The carrier gas supply and the flushing gas supply are also not directed into the test chamber 18 via separate hose lines, but directly into the gas control unit 16. Here, the test chamber 18 has only two ports. A separate port for the supply of carrier gas and/or for the supply of flushing gas is not required. Correspondingly, also the gas detection unit 14 needs only two ports 32, 34, as well as the outlet for the evacuation of the mass spectrometer 24, without requiring separate ports for pumps, valves, pressure measuring devices and the like.

The invention claimed is:

1. A vacuum-leak detection system comprising:
    a test chamber unit having a test chamber gas inlet and a test chamber gas outlet;
    a gas detection unit having a gas detection gas inlet and a gas detection gas outlet; and
    a gas control unit connected between the test chamber unit and the gas detection unit, the gas control unit having a plurality of gas inlets, a plurality of gas outlets and a plurality of gas conduction paths for selectively connecting the plurality of gas inlets and the plurality of gas outlets:
    wherein the plurality of gas inlets includes a first gas inlet connected to the test chamber gas outlet, a second gas inlet connected to the gas detection gas outlet and a third gas inlet which is open towards the atmosphere;
    wherein the plurality of gas outlets includes a first gas outlet connected to the test chamber gas inlet, a second gas outlet connected to the gas detection gas inlet and a third gas outlet;
    wherein the plurality of gas conduction paths include a carrier gas conduction path that connects the third gas inlet to the first gas outlet in order to supply carrier gas to the test chamber unit via the test chamber gas inlet.

2. The vacuum leak detection system of claim 1, wherein the gas control unit comprises a vacuum pump that is connected to the first gas inlet and configured to evacuate the test chamber unit via the test chamber gas outlet.

3. The vacuum leak detection system of claim 1, wherein the vacuum leak detection system is formed modularly by the test chamber unit, the gas detection unit and the gas control unit as separate modules adapted to be detachably connected to each other.

4. The vacuum leak detection system of claim 1, wherein the plurality of gas conduction paths includes a test gas conduction path that connects the first gas inlet to the second gas outlet.

5. The vacuum leak detection system of claim 1, wherein the first gas outlet and the second gas inlet are not connected to each other via any of the plurality of gas conduction paths.

6. The vacuum leak detection system of claim 4, wherein the third gas outlet is open to the atmosphere, and the plurality of gas conduction paths includes a return gas conduction path that connects the second gas inlet to the third gas outlet.

7. The vacuum leak detection system of claim 6, wherein the return gas conduction path comprises a separately controllable valve and a vacuum pump, and wherein the plurality of gas conduction paths includes an evacuation gas conduction path that connects the test gas conduction path to the return gas conduction path, the evacuation gas conduction path comprising a separately controllable valve.

8. The vacuum leak detection system of claim 4, wherein the test gas conduction path comprises a separately controllable valve.

9. The vacuum leak detection system of claim 1, wherein the carrier gas conduction path comprises a separately controllable valve and a flow throttle, and wherein the plurality of gas conduction paths includes a bypass branch that connects the third gas inlet to the first gas outlet to thereby bypass the separately controllable valve and the flow throttle of the carrier gas conduction path, the bypass branch comprising a separately controllable valve.

10. The vacuum leak detection system of claim 1, wherein the plurality of gas conduction paths are arranged in a common valve block.

11. The vacuum leak detection system of claim 1, wherein the test chamber unit comprises a vacuum chamber designed as a test chamber in the form of a rigid test chamber or in the form of a flexible film chamber.

12. The vacuum leak detection system of claim 1, further comprising:
an auxiliary pump module that is configured to be connected to the gas control unit to increase a pumping capacity of the gas control unit.

13. A method for gas leak detection comprising:
providing a vacuum leak detection system that comprises:
a test chamber unit having a test chamber gas inlet and a test chamber gas outlet:
a gas detection unit having a gas detection gas inlet and a gas detection gas outlet; and
a gas control unit connected between the test chamber unit and the gas detection unit, the gas control unit having a plurality of gas inlets, a plurality of gas outlets and a plurality of gas conduction paths for selectively connecting the plurality of gas inlets and the plurality of gas outlets;
wherein the plurality of gas inlets includes a first gas inlet connected to the test chamber gas outlet, a second gas inlet connected to the gas detection gas outlet and a third gas inlet which is open towards the atmosphere;
wherein the plurality of gas outlets includes a first gas outlet connected to the test chamber gas inlet, a second gas outlet connected to the gas detection gas inlet and a third gas outlet:
wherein the plurality of gas conduction paths includes a carrier gas conduction path that connects the third gas inlet to the first gas outlet in order to supply carrier gas to the test chamber unit via the test chamber gas inlet, a test gas conduction path that connects the first gas inlet to the second gas outlet, a return gas conduction path that connects the second gas inlet to the third gas outlet, and an evacuation gas conduction path that connects the test gas conduction path to the return gas conduction path, the return gas conduction path including a vacuum pump;
opening the evacuation gas conduction path and evacuating the test chamber unit using the vacuum pump;
after evacuating the test chamber unit, blocking the evacuation gas conduction path; and
with the carrier gas conduction path, the test gas conduction path and the return gas conduction path open, operating the vacuum pump in order to supply a carrier gas to the test chamber unit via the third gas inlet and to supply a mixture of the carrier gas and leakage gas to the gas detection unit via the second gas outlet.

14. The method ding toof claim 13, further comprising:
blocking the test gas conduction path and opening the evacuation gas conduction path; and
operating the vacuum pump to flush the test chamber unit with gas drawn from the atmosphere via the third gas inlet.

15. The method of claim 13, wherein the test gas conduction path and the return gas conduction path are each closed while the test chamber unit is evacuated.

16. A gas control unit for a vacuum leak detection system that includes a test chamber unit having a test chamber gas inlet and a test chamber gas outlet and a gas detection unit having a gas detection gas inlet and a gas detection gas outlet, the gas control unit comprising:
a plurality of gas inlets including a first gas inlet that is configured to be connected to the test chamber gas outlet, a second gas inlet that is configured to be connected to the gas detection gas outlet and a third gas inlet which is open towards the atmosphere;
a plurality of gas outlets including a first gas outlet that is configured to be connected to the test chamber gas inlet, a second gas outlet that is configured to be connected to the gas detection gas inlet and a third gas outlet;
a plurality of gas conduction paths for selectively connecting the plurality of gas inlets and the plurality of gas outlets, the plurality of gas conduction paths including a carrier gas conduction path that connects the third gas inlet to the first gas outlet in order to supply carrier gas to the test chamber unit via the test chamber gas inlet.

17. The gas control unit of claim 16, further comprising:
a vacuum pump that is connected to the first gas inlet and configured to evacuate the test chamber unit via the test chamber gas outlet.

18. The gas control unit of claim 16, wherein the plurality of gas conduction paths includes a test gas conduction path that connects the first gas inlet to the second gas outlet.

19. The gas control unit of claim 16, wherein the first gas outlet and the second gas inlet are not connected to each other via any of the plurality of gas conduction paths.

20. The gas control unit of claim 18, wherein the third gas outlet is open to the atmosphere, and the plurality of gas conduction paths includes a return gas conduction path that connects the second gas inlet to the third gas outlet.

21. The gas control unit of claim 20, wherein the return gas conduction path comprises a separately controllable valve and a vacuum pump, and wherein the plurality of gas conduction paths includes an evacuation gas conduction path that connects the test gas conduction path to the return gas conduction path, the evacuation gas conduction path comprising a separately controllable valve.

22. The gas control unit of claim 18, wherein the test gas conduction path comprises a separately controllable valve.

23. The gas control unit of claim 16, wherein the carrier gas conduction path comprises a separately controllable valve and a flow throttle, and wherein the plurality of gas conduction paths includes a bypass branch that connects the third gas inlet to the first gas outlet to thereby bypass the separately controllable valve and the flow throttle of the carrier gas conduction path, the bypass branch comprising a separately controllable valve.

24. The gas control unit of claim 16, wherein the plurality of gas conduction paths are arranged in a common valve block.

25. The gas control unit of claim 16, wherein the test chamber unit comprises a vacuum chamber designed as a test chamber in the form of a rigid test chamber or in the form of a flexible film chamber.

26. The gas control unit of claim 16, further comprising:
an auxiliary pump module that is configured to be connected to the gas control unit to increase a pumping capacity of the gas control unit.

27. The gas control unit of claim 16, wherein the plurality of gas conduction paths includes a test gas conduction path that connects the first gas inlet to the second gas outlet, a return gas conduction path that connects the second gas inlet to the third gas outlet, and an evacuation gas conduction path that connects the test gas conduction path to the return gas conduction path;
wherein the evacuation gas conduction path includes a first valve, the test gas conduction path includes a second valve, and the return gas conduction path includes a third valve;
wherein the evacuation gas conduction path is connected to the test gas conduction path between the second valve and the first gas inlet and is connected to the return gas conduction path between the third valve and the third gas outlet;
wherein the return gas conduction path includes a vacuum pump that is positioned between the third valve and the third gas outlet.

28. The vacuum leak detection system of claim 1, wherein the plurality of gas conduction paths includes a test gas conduction path that connects the first gas inlet to the second gas outlet, a return gas conduction path that connects the second gas inlet to the third gas outlet, and an evacuation gas conduction path that connects the test gas conduction path to the return gas conduction path;
wherein the evacuation gas conduction path includes a first valve, the test gas conduction path includes a second valve, and the return gas conduction path includes a third valve;
wherein the evacuation gas conduction path is connected to the test gas conduction path between the second valve and the first gas inlet and is connected to the return gas conduction path between the third valve and the third gas outlet;
wherein the return gas conduction path includes a vacuum pump that is positioned between the third valve and the third gas outlet.

* * * * *